No. 847,769. PATENTED MAR. 19, 1907.
E. W. HARTOUGH.
TANDEM SPRING FRICTION DRAFT RIGGING.
APPLICATION FILED DEC. 29, 1905.

3 SHEETS—SHEET 1.

Witnesses:
R. E. Hamilton
J. Moore

Inventor:
Edward W. Hartough
By F. G. Fischer atty.

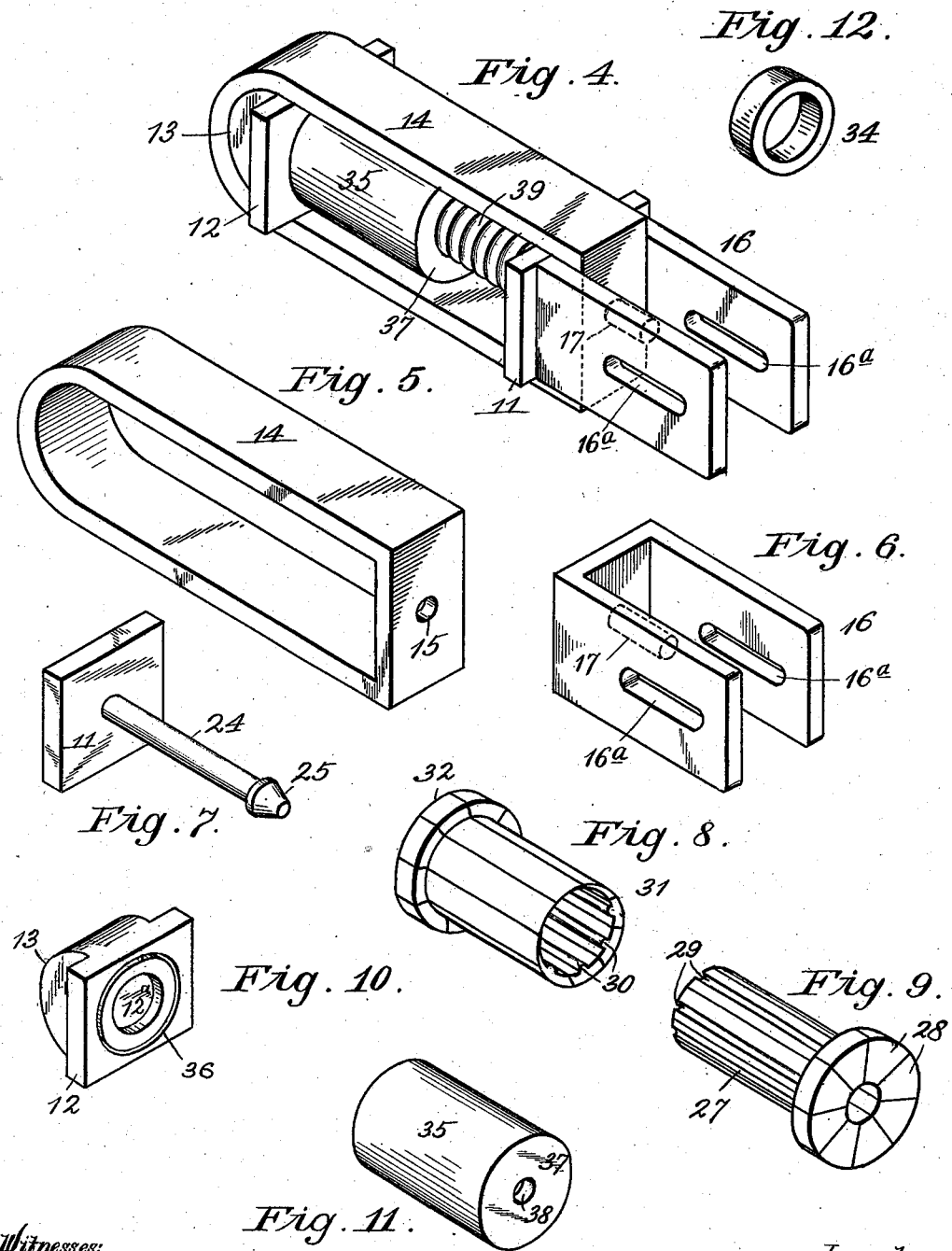

No. 847,769. PATENTED MAR. 19, 1907.
E. W. HARTOUGH.
TANDEM SPRING FRICTION DRAFT RIGGING.
APPLICATION FILED DEC. 29, 1905.
3 SHEETS—SHEET 3.
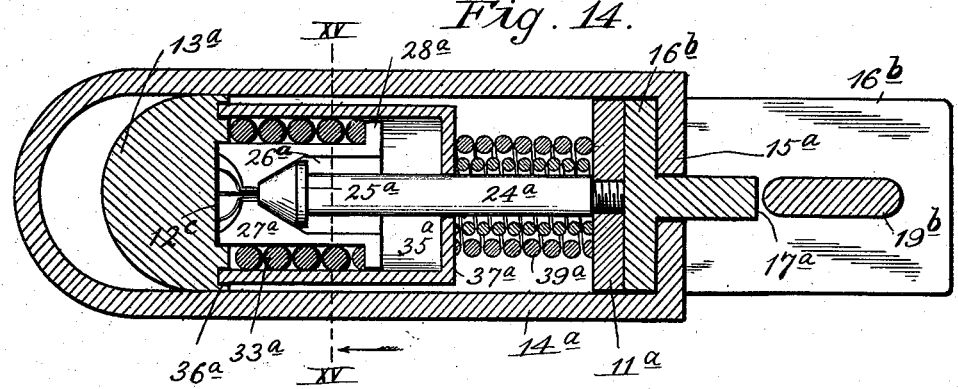
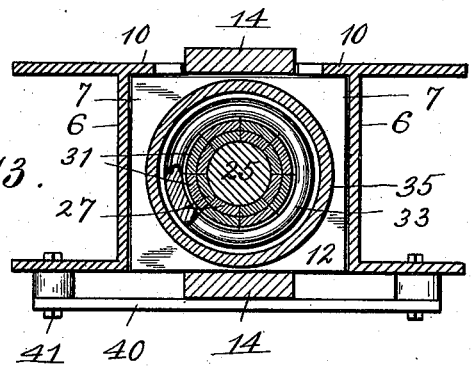
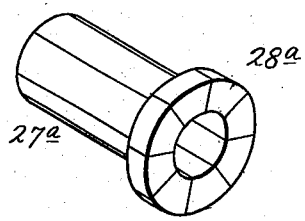
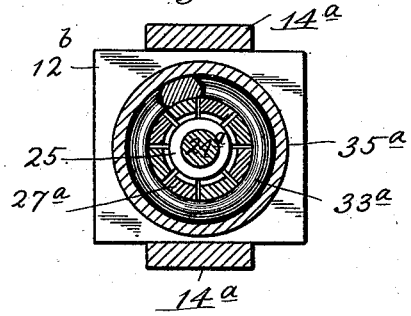
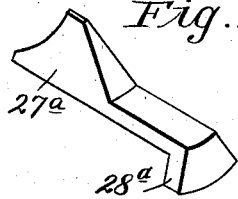
Witnesses:
R. E. Hamilton
J. Moore
Inventor:
Edward W. Hartough
By F. G. Fischer
Atty.

UNITED STATES PATENT OFFICE.

EDWARD W. HARTOUGH, OF THAYER, MISSOURI.

TANDEM-SPRING FRICTION DRAFT-RIGGING.

No. 847,769.  Specification of Letters Patent.  Patented March 19, 1907.

Application filed December 29, 1905. Serial No. 293,729.

*To all whom it may concern:*

Be it known that I, EDWARD W. HARTOUGH, a citizen of the United States, residing at Thayer, in the county of Oregon and State of Missouri, have invented certain new and useful Improvements in Tandem - Spring Friction Draft-Rigging, of which the following is a specification.

My invention relates to improvements in tandem-spring friction draft-rigging for cars; and my object is to provide a rigging wherein the draft-springs coöperate in resisting both compression and tractive strains.

The invention further consists in friction devices for assisting the springs in resisting said strains.

In order that the invention may be fully understood, reference will now be made to the accompanying drawings, in which—

Figure 1:
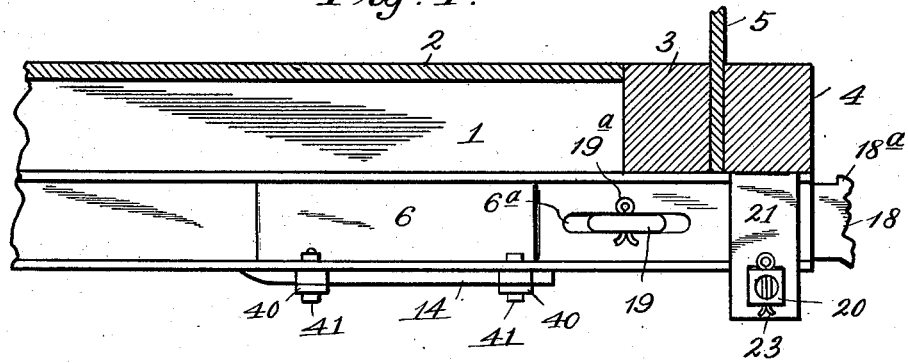
Figure 2:
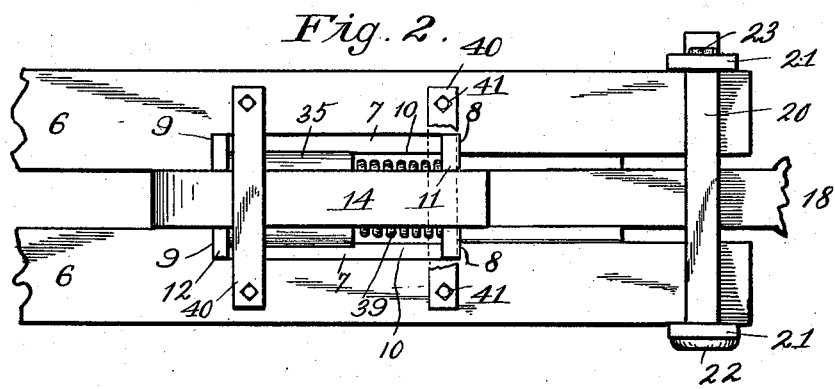
Figure 3:
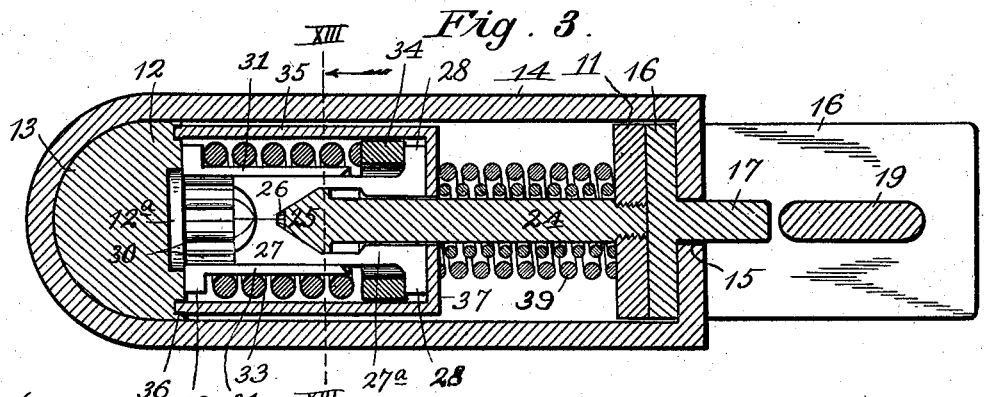

Figure 1 represents a side elevation of the improved draft-rigging secured to the under side of a car. Fig. 2 is an inverted plan view thereof. Fig. 3 is an enlarged vertical longitudinal section of the draft-rigging proper in its normal position. Fig. 4 is a perspective view of same. Figs. 5 and 6 are detail perspective views of a loop and yoke employed in carrying out the invention. Fig. 7 is a detail perspective view of a front follower-plate and a plunger forming part of the invention. Figs. 8 and 9 are slightly-enlarged detail perspective views of chafing-irons and spreader-blocks forming part of the invention. Fig. 10 is a detail perspective view of a rear follower-plate. Fig. 11 is a detail perspective view of a drum for inclosing the chafing-iron and the spreader-blocks. Fig. 12 is a detail perspective view of a ring employed in carrying out the invention. Fig. 13 is a cross-section taken on line XIII XIII of Fig. 3 with the draft-arms added thereto. Fig. 14 is a vertical longitudinal section of a modified form of the draft-rigging under compressive strain. Fig. 15 is a transverse section of the same, taken on line XV XV of Fig. 14. Fig. 16 is a detail perspective view of the spreader-blocks forming part of said modified form, and Fig. 17 is a detail of one of the spreader-blocks.

Referring now to said drawings. 1 designates the draft-sills of a car, which are covered by a decking 2 and abut against an end sill 3. 4 designates the dead-wood, and 5 the siding, of the car.

6 designates a pair of metallic draft-arms suitably secured to the draft-sills and provided at their under sides with oppositely-disposed pockets 7, the ends of which form front and rear stops 8 and 9, respectively. The upper sides of said pockets are closed by flanges 10, which act as guides for the upper surface of a forward follower-plate 11 and a rear follower-plate 12. Said follower-plates 11 and 12 normally bear against stops 8 and 9, respectively. Follower-plate 12 is provided with a semicircular rear end 13, adapted to fit snugly within the semicircular rear end of a loop 14, loosely embracing the top and bottom sides of both follower-plates, and provided at its forward end with a centrally-disposed opening 15. The front surface of follower-plate 12 is provided with a centrally-disposed circular recess $12^a$ for a purpose hereinafter described.

16 designates a yoke embracing the forward end of the loop and provided with slots $16^a$ and a stud 17, which latter projects forwardly through opening 15 and enters the rear portion of a draw-bar 18, thereby holding said rear portion, loop 14, and the rear end of the yoke in horizontal alinement. The yoke is further secured to the draw-bar by means of a snugly-fitting draft-key 19, which extends through said draw-bar, slots $16^a$ and elongated slots $6^a$ in the forward portion of the draft-arms, and is held from longitudinal movement by cotter-pins $19^a$. The forward portion of the draw-bar is supported by a hollow key 20, extending through the depending ends of a yoke 21, and held in position by an integral head 22 and a cotter-pin 23. Draw-bar 18 is provided at its upper forward portion with the customary dashboard $18^a$, adapted to contact with dead-wood 4, and thus limit the backward movement of said draw-bar. Yoke 21 is secured to the forward ends of the draft-arms, the upper sides of which latter are recessed for the reception of the yoke, so that the upper surface thereof will be flush with the upper surface of said draft-arms.

The front follower-plate is provided with a rearwardly-projecting plunger, consisting of a stem 24 and a conical head 25, the forward end of stem 24 being screwed into the follower-plate so that it may be removed therefrom, should it become broken or too badly worn for further use. Head 25 fits within a pocket 26, formed within a plurality of spreader-blocks 27 of segmental form in cross-section, so that their adjacent sides will fit together when said spreader-blocks occupy their normal position. The rear wall of pocket 26 is conical to snugly embrace head 25, and also to enlarge and strengthen the rear portions of the spreader-blocks, as said portions are subjected to the greatest strain when the rigging is either under compressive or tractive force. The forward portions of the spreader-blocks are also enlarged at $27^a$ to give them additional strength, while their forward ends are provided with flanges 28, for a purpose hereinafter described.

Each spreader-block is provided at its outer surface with a longitudinal groove 29 for the reception of longitudinal ribs 30 integral with the inner side of chafing-irons 31, which latter, like the spreader-blocks, are segmental in cross-section, so that their adjacent sides will abut when said chafing-irons occupy their normal position. By thus providing the interlocking ribs and grooves the chafing-irons will be held in proper telescopic relation with the spreader-blocks and cannot turn upon the latter. The chafing-irons are provided at their rear ends with flanges 32, held in contact with the front surface of follower-plate 12 by means of a helical draft-spring 33 embracing the chafing-irons and abutting at its opposite ends against flanges 32 and a ring 34, which latter is held by the spring in contact with the rear side of flanges 28, said springs normally holding the parts in the position shown in Fig. 3.

Ring 34 substantially fills the space between the ends of the chafing-irons and flanges 28, and thus prevents the front end of spring 33 from getting caught between said parts while they are undergoing telescopic action. The interior diameter of ring 34 is large enough to admit the forward ends of the chafing-irons when the latter are spread apart as hereinafter described, and said spring is held from lateral movement by means of a drum 35 loosely embracing said ring, flanges 28 and 32, and spring 33.

The rear end of drum 35 is open, so that the parts inclosed in said drum may be readily inserted or removed therefrom when necessary, and in order that said open end may successfully resist the internal pressure to which it is subjected by spring 33 when the rigging is under either tractive or compressive strain I provide an annular recess 36 in the front side of plate 12, in which said open end snugly fits. This arrangement also reliably holds the drum in axial alinement with the plunger. The forward end of the drum is closed by a head 37, having a central aperture 38, through which stem 24 extends.

39 designates a double-coil draft-spring embracing stem 24 and abutting at its opposite ends against head 37 and the rear side of follower-plate 11, said spring being interposed between the head and the plate in order to normally hold them in the position shown in Fig. 3. Spring 39 is stronger than spring 33, and thus reliably holds the drum in contact with the rear follower-plate.

Loop 14 and the parts carried thereby are held in position between the draft-arms by means of transverse straps 40, secured to the under sides of the draft-arms by bolts 41. By removing said straps, draft-key 19, and the hollow key 20 it is obvious that the draw-bar, the yoke, the loop, and the parts carried thereby may be readily removed from the draft-arms.

The draft-springs and the dashboard $18^a$ are so spaced that when the plunger has fully expanded and pushed the spreader-blocks to the rear of their backward movement further backward movement of said plunger will be arrested by the complete compression of the springs and the dashboard contacting with dead-wood 4, which latter operation takes place simultaneously with the complete compression of the springs and thus prevent the plunger from becoming bent.

Recess $12^a$ permits the spreader-blocks to move to the end of their backward movement without contacting with the rear follower-plate.

After the rigging has been relieved of compressive or tractive force spring 39 releases the plunger from the grip of the spreader-blocks, and all of the parts are returned to their normal position by said spring and spring 33.

The operation of the draft-rigging under compressive force is substantially as follows: Backward movement of the draw-bar, yoke 16, and the loop forces the forward follower-plate backwardly, and thereby compresses spring 39 between said moving plate and head 37 of the drum, which latter is held from backward movement by the rear follower-plate abutting against stops 9. As the front follower-plate moves backwardly it of course will carry the plunger therewith, so that the conical head 25, acting on the conical end of the pocket 26, will force the spreader-block 27 both backwardly and apart, so that they in turn will force the chafing-irons apart against the spring 33, thus expanding the latter diametrically until it frictionally engages both the drum and the chafing-irons. As the plunger continues to move backwardly it will carry the spreader-blocks therewith, the flanges of which latter in turn move ring 34 backwardly, and thus compress spring 33 between said moving ring and flanges 32, which latter are held from backward movement by the rear follower-plate. This operation creates frictional resistance between the telescoping spreader-blocks and chafing-irons, the chafing-irons and spring 33, and between said spring and the interior surface of the drum.

The action of the rigging under tractive force is as follows: When the draw-bar is pulled outwardly, it of course carries yoke 16 and loop 14 therewith, while the plunger and the forward follower-plate remain stationary, said follower-plate being held from forward movement by stops 8. The forward movement of the loop carries the rear follower-plate therewith, causing it to move the drum forwardly, and thus compress spring 39. The rear follower-plate also moves the chafing-irons 31 forwardly, causing them to compress spring 33, so that the latter bearing against ring 34 will force it and the spreading-blocks forwardly, causing the conical end of pocket 26 to ride upon the conical head 25, and thus force said blocks apart. The spreading of the blocks will force the chafing-irons apart, which in turn force spring 33 into frictional contact with the interior of the drum.

From the above description it is apparent that the frictional devices and the two draft-springs 33 39 coöperate in resisting both the tractive and compressive strains and by their united action offer an effective though limited yielding resistance to said strains.

Referring now to the modified form illustrated by Figs. 14, 15, 16, and 17, $14^a$ designates a loop provided at its forward end with an opening $15^a$ for the reception of a stud $17$, projecting from the rear ends of a yoke $16^b$, embracing the forward end of said loop. $11^a$ and $13^a$ designate front and rear follower-plates, respectively, embraced by the loop. The forward follower-plate is provided with a rearwardly-projecting plunger, consisting of a stem $24^a$, screwed into said follower-plate, and a rear terminal having a conical head $25^a$ fitting within a pocket $26^a$, formed by spreader-blocks $27^a$, having integral flanges $28^a$ at their forward ends. The forward ends of the spreader-blocks are normally held in contact with the head $37^a$ of a drum $35^a$ by means of a helical draft-spring $33^a$, embracing said spreader-blocks and bearing, at its opposite ends, against the rear follower-plate and flanges $28^a$. Head $37^a$ is provided with a centrally-disposed opening, through which stem $24^a$ extends, and the rear terminal of the drum is held in a recess $36^a$ in the rear follower-plate by a double draft-spring $39^a$, interposed between the drumhead and the front follower-plate. The construction and operation of this modified form of draft-rigging is similar to the preferred form, except that chafing-irons 31 and ring 34 are omitted. Consequently when the rigging is under compressive force spring $33^a$ will be compressed between the rear follower-plate and flanges $28^a$. This construction also permits a reduction in the size of spring $33^a$, drum $35^a$, and the loop $14^a$.

Having thus described my invention, what I claim, and desire to secure by Letters Patent, is—

1. In a draft-rigging, a drum, friction members movably arranged therein and having frictional engagement with each other, and a draft-spring encircling the friction members and adapted to be forced thereby into frictional engagement with the drum.

2. In a draft-rigging, a drum, friction members movably arranged therein and having frictional engagement with each other, chafing-irons embracing the friction members and adapted to be expanded thereby, and a draft-spring encircling the chafing-irons and adapted to be forced thereby into frictional engagement with the drum.

3. In a draft-rigging, a plunger, spreader-blocks frictionally engaging the same, a draft-spring encircling the spreader-blocks, and a drum inclosing the draft-spring so that the latter may be forced into frictional engagement therewith by the spreader-blocks.

4. In a tandem-spring friction draft-rigging, a drum, friction members movably arranged therein and having frictional engagement with each other, a draft-spring encircling the friction members and adapted to be forced thereby into frictional engagement with the drum, another draft-spring which abuts against the forward end of the drum, and means which coöperate with the drum and the friction members in simultaneously compressing the draft-springs either under compressive or tractive force.

5. In a tandem-spring friction draft-rigging, a drum, friction members movably arranged therein and having frictional engagement with each other, chafing-irons telescopically embracing the friction members and adapted to be expanded thereby, a draft-spring encircling the chafing-irons and adapted to be enforced thereby into frictional engagement with the drum, another draft-spring which abuts against the forward end of the drum, and means which coöperate with the drum and the chafing-irons in simultaneously compressing the draft-springs either under compressive or tractive force.

6. In a draft-rigging, a front follower-plate arranged to move backwardly and forwardly, means for moving said plate backwardly a limited distance, stops for limiting the forward movement of said plate, a plunger projecting rearwardly from said plate, spreader-blocks forming a pocket in which the rear end of said plunger is arranged, said plunger being adapted to spread said blocks apart and move them backwardly therewith a portion of its stroke, a drum inclosing the blocks and provided with a closed end against which the forward terminals of said blocks normally abut, and a helical spring interposed between the drum and the blocks for resisting both the spreading action and backward movement of the latter by frictionally engaging throughout its length the exterior of the blocks and the interior of the drum.

7. In a draft-rigging, a plunger arranged to move backwardly and forwardly, means for limiting the backward movement of said plunger, spreader-blocks forming a pocket in which the rear end of said plunger is arranged, said plunger being adapted to spread the blocks apart and move them backwardly therewith a portion of its stroke, a drum inclosing the blocks and provided with a closed end for limiting the forward movement of the blocks, a rear follower-plate against which said drum abuts, and resilient means interposed between said drum and the blocks for resisting both the spreading action and the rearward movement of the latter.

8. In a draft-rigging, a plunger arranged to move backwardly and forwardly, means for limiting the backward movement of said plunger, spreader-blocks forming a pocket in which the rear end of said plunger is arranged, said plunger being adapted to spread the blocks apart and move them backwardly therewith a portion of its stroke, a drum inclosing said blocks and adapted to limit their forward movement, a rear follower-plate provided with a recess for the reception of the rear ends of the blocks, an annular groove for the reception of the rear end of the drum, and a helical spring interposed between the drum and the blocks for resisting both the spreading action and backward movement of the latter by frictionally engaging, throughout its length, the exterior of the blocks and the interior of the drum.

9. In a draft-rigging, spreader-blocks forming a pocket and arranged to move backwardly and forwardly, a plunger having one end arranged in the pocket so that said blocks will be spread apart thereby when they move forwardly, a rear follower-plate arranged to move backwardly and forwardly, stops for limiting the backward movement of said plate, a drum inclosing the blocks and abutting against the plate so that it will move forwardly with the latter, and resilient means interposed between the plate, the drum, and the blocks for moving the latter forwardly and retarding said movement and the spreading action of the blocks by frictionally engaging the exterior of the latter and the interior of the drum.

10. In a tandem-spring friction draft-rigging, spreader-blocks forming a pocket and arranged to move backwardly and forwardly, a plunger having one end arranged in the pocket so that said blocks will be spread apart thereby when they move forwardly, a rear follower-plate arranged to move backwardly and forwardly, stops for limiting the backward movement of said plate, a drum inclosing the blocks and abutting against the plate so that it will move forwardly with the latter, a helical spring interposed between the drum and the blocks for resisting both the spreading action and longitudinal movement of the latter by frictionally engaging, throughout its length, the exterior of the blocks and the interior of the drum, and resilient means abutting against the forward end of said drum for resisting its forward movement.

11. In a draft-rigging, spreader-blocks forming a pocket and arranged to move backwardly and forwardly, a plunger having one end arranged in the pocket so that said blocks will be spread apart thereby when they move forwardly, a rear follower-plate arranged to move backwardly and forwardly, stops for limiting the backward movement of said plate, a loop for moving the plate forwardly, a drum inclosing the blocks and abutting against the plate so that it will move forwardly with the latter, and resilient means interposed between the plate, the drum, and the blocks for moving the latter forwardly and retarding said movement and the spreading action of blocks by frictionally engaging the exterior of the latter and the interior of the drum.

12. In a draft-rigging, a front follower-plate arranged to move backwardly and forwardly, a yoke for moving said plate backwardly a limited distance, stops for limiting the forward movement of said plate, a plunger projecting rearwardly from said plate, spreader-blocks forming a pocket in which the rear end of said plunger is arranged, said plunger being adapted to spread said blocks apart and move them backwardly therewith a portion of its stroke, and resilient means for resisting both the spreading action and the backward movement of said blocks.

13. In a tandem-spring friction draft-rigging, a front follower-plate arranged to move backwardly and forwardly, a plunger projecting rearwardly from said plate, spreader-blocks forming a pocket in which the rear end of said plunger is arranged, said plunger being adapted to spread said blocks apart and move them backwardly therewith a portion of its stroke, a drum inclosing the blocks and provided with a closed end against which the forward terminals of said blocks normally abut, a rear follower-plate arranged to move backwardly and forwardly, said plate abutting at its forward side against the rear end of the drum, a helical spring embracing the blocks to resist their spreading action and thus indirectly resist the backward movement of the front follower-plate and the forward movement of the rear follower-plate, and a draft-spring interposed between the front follower-plate and the forward end of the drum to coöperate with the helical spring in resisting said movements of the follower-plates.

14. In a draft-rigging, a plunger arranged to move longitudinally, spreader-blocks forming a pocket in which the rear end of said plunger is arranged, said plunger being adapted to spread said blocks apart and move them backwardly therewith a portion of its stroke, a follower-plate, chafing-irons telescopically mounted upon the spreader-blocks and abutting at their rear terminals against said plate, a drum inclosing the spreader-blocks and the chafing-irons and abutting at its rear end against the plate, and a spring embracing the chafing-irons for limiting the telescopic and spreading action of the spreader-blocks and the chafing-irons by being compressed longitudinally and forced into frictional contact, throughout its length, with both the drum and said chafing-plates, when the draft-rigging is under either tractive or compressive force.

15. In a draft-rigging, a plunger arranged to move longitudinally, spreader - blocks forming a pocket in which the rear end of said plunger is arranged, said plunger being adapted to spread said blocks apart and move them backwardly therewith a portion of its stroke, a follower-plate, chafing-irons embracing the spreader-blocks and arranged to telescope thereon, flanges integral with the rear ends of said chafing-irons which abut against the follower-plate, a drum inclosing the spreader-blocks and the chafing-irons and abutting at one end against the follower-plate, flanges integral with the forward ends of said spreader-blocks and normally abutting against the closed end of the drum, and a helical spring interposed between the flanges of the chafing-irons and the flanges of the spreader-blocks for resisting the telescopic action of said chafing-irons and spreader-blocks by being compressed longitudinally and forced into frictional engagement with the chafing-irons and the drum.

16. In a draft-rigging for cars, a plunger arranged to move longitudinally, spreader-blocks forming a pocket in which the rear end of said plunger is arranged, said plunger being adapted to spread said blocks apart and move them backwardly therewith a portion of its stroke, a follower-plate, chafing-irons embracing the spreader-blocks and arranged to telescope thereon, flanges integral with the rear ends of said chafing-irons which abut against said plate, a drum inclosing the spreader-blocks and the chafing-irons and abutting at one end against the follower-plate, flanges integral with the forward ends of the spreader-blocks and normally abutting against the closed end of the drum, a ring abutting against the flanges of the spreader-blocks, and a helical spring interposed between said ring and the flanges on the chafing-irons to resist the telescopic action of the spreader-blocks and the chafing-irons by being compressed longitudinally, and forced into frictional engagement with the chafing-irons and the drums when the draft-rigging is under either tractive or compressive force.

17. In a draft-rigging, a plunger arranged to move longitudinally, spreader - blocks forming a pocket in which the rear end of said plunger is arranged, said plunger being adapted to spread said blocks apart and move them backwardly therewith a portion of its stroke, a follower-plate, chafing-irons embracing the spreader-blocks and arranged to telescope thereon, flanges integral with the rear ends of said chafing-irons which abut against the follower-plate, a drum inclosing the spreader-blocks and the chafing-irons and abutting at one end against the follower-plate, flanges integral with the forward ends of the spreader-blocks and normally abutting against the closed end of the drum, a helical spring interposed between the flanges to resist the telescopic action of the spreader-blocks and the chafing-irons by being both compressed and forced into frictional engagement with the chafing-irons and the drum, and interlocking grooves and ribs for holding the chafing-irons and the spreader-blocks in longitudinal alinement.

18. In a tandem-spring friction draft-rigging, the combination with a coupler, of a pair of draft-arms provided with oppositely-disposed pockets, the ends of which form front and rear stops, a front follower-plate normally abutting against the front stops, a rear follower-plate normally abutting against the rear stops, a plunger projecting rearwardly from the front follower-plate, a yoke attached to the coupler, a loop encircling the rear portion of said yoke and the rear follower-plate, for moving the latter forward, a drum abutting against said rear follower-plate, a draft-spring abutting against the front follower-plate and the drum for resisting either the backward movement of the former or the forward movement of the latter, spreader-blocks slidingly arranged in the drum and forming a pocket in which the rear end of the plunger is arranged, the movement of said spreader-blocks being limited by the drum and the springs so they will be spread apart by the plunger when the draft-rigging is subjected to either compressive or tractive force, flanges on the front ends of said blocks, and a helical spring interposed between said flanges and the rear follower-plate which coacts with the draft-spring in resisting the movements of the front follower-plate and the drum.

19. In a draft-rigging, a pair of draft-arms provided with oppositely-disposed pockets forming front and rear stops, flanges closing one side of each pocket, front and rear follower-plates arranged to slide in said pockets, resilient means for normally holding said plates against their respective stops, a loop encircling the follower-plates and arranged between the draft-arms, and transverse strips detachably secured to the draft-arms for supporting said loop.

In testimony whereof I affix my signature in the presence of two witnesses.

EDWARD W. HARTOUGH.

Witnesses:
FRANK A. STICKLAND,
WILLIAM M. WADLEY.